(No Model.) 2 Sheets—Sheet 1.
W. EVERDELL.
FENDER FOR CARS.
No. 558,793. Patented Apr. 21, 1896.
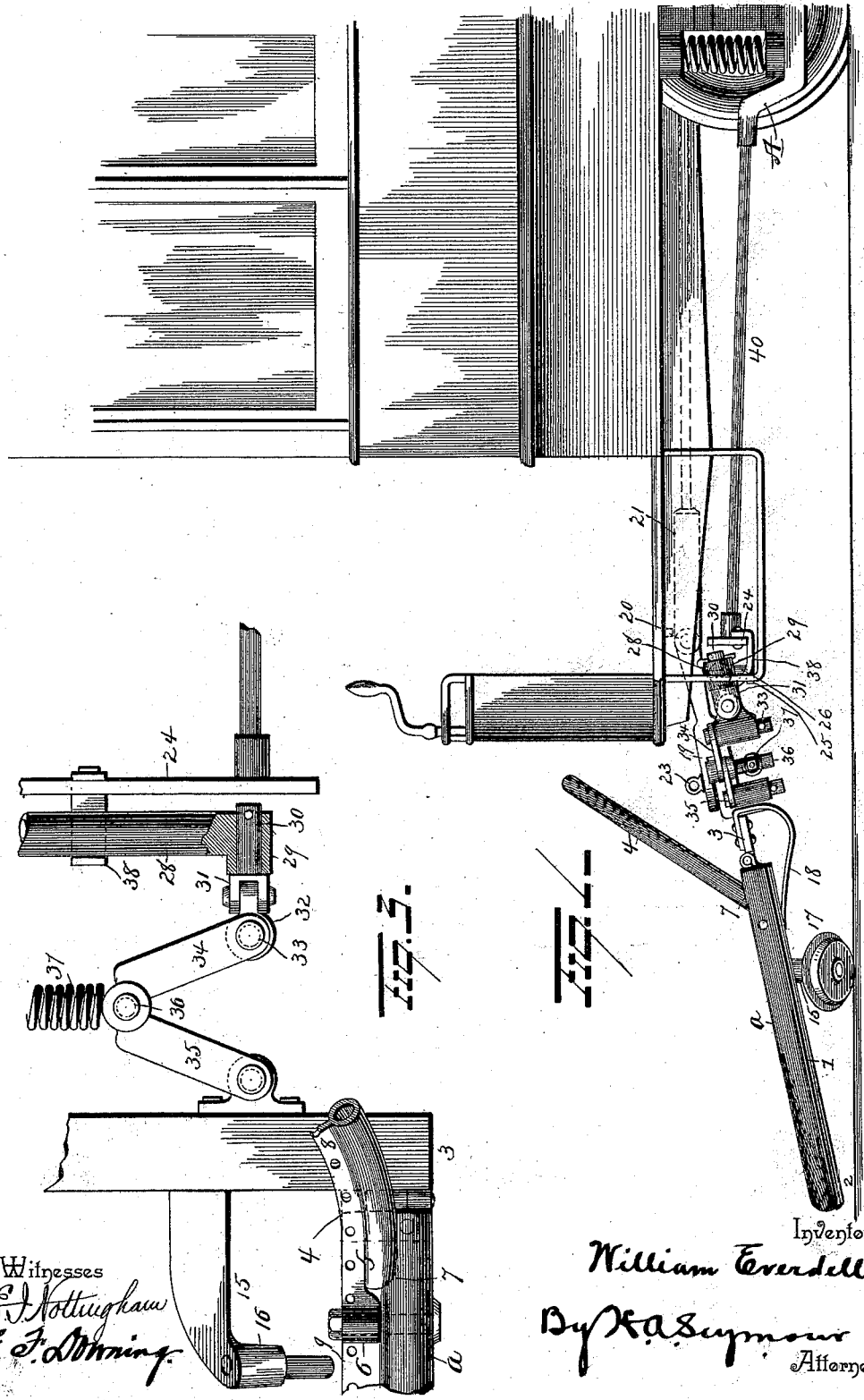
Witnesses
E. J. Nottingham
G. F. Downing
Inventor
William Everdell
By H. A. Seymour
Attorney

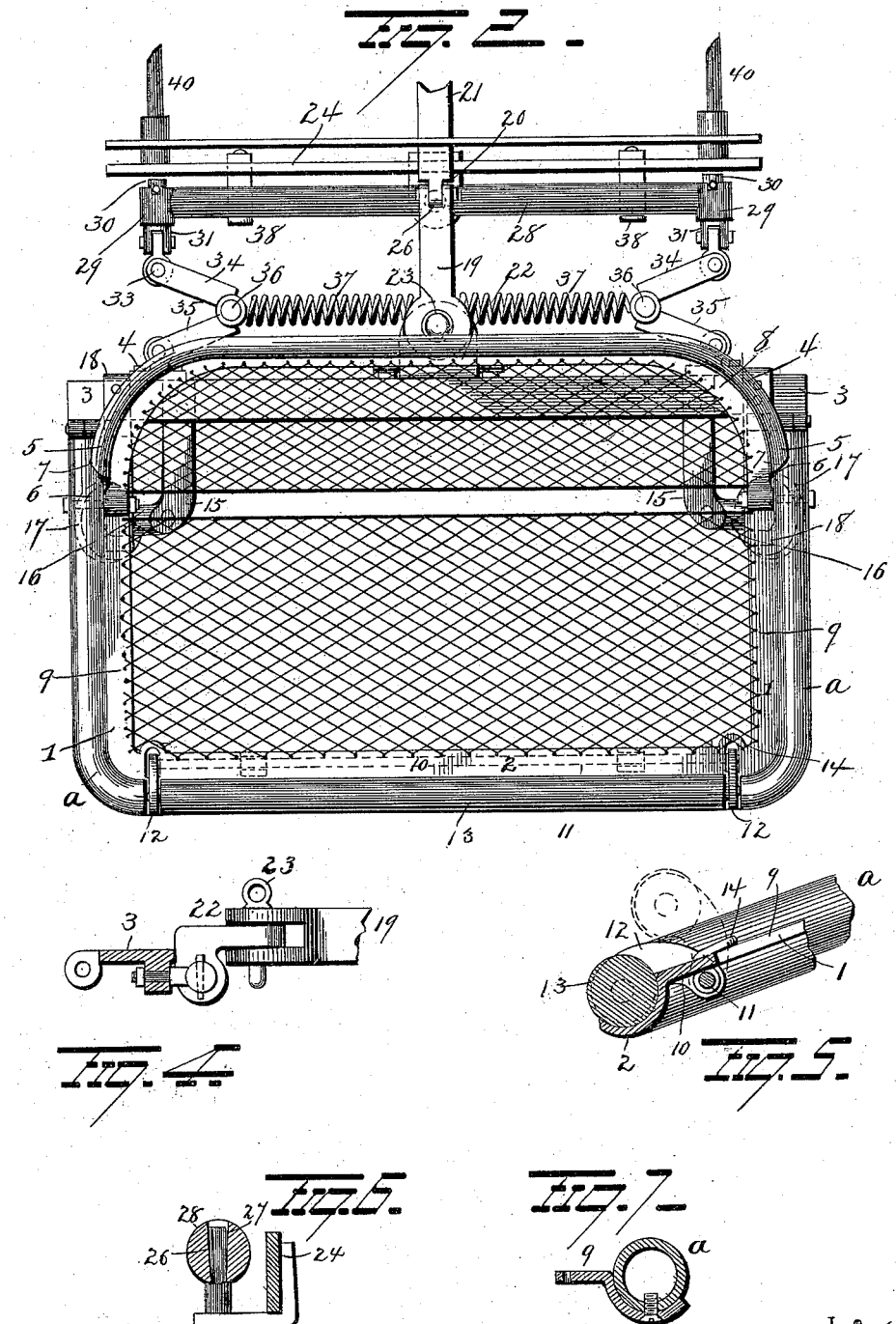

UNITED STATES PATENT OFFICE.

WILLIAM EVERDELL, OF BROOKLYN, NEW YORK.

FENDER FOR CARS.

SPECIFICATION forming part of Letters Patent No. 558,793, dated April 21, 1896.

Application filed January 13, 1896. Serial No. 575,320. (No model.)

*To all whom it may concern:*

Be it known that I, WILLIAM EVERDELL, a resident of Brooklyn, in the county of Kings and State of New York, have invented certain new and useful Improvements in Fenders for Cars; and I do hereby declare the following to be a full, clear, and exact description of the invention, such as will enable others skilled in the art to which it appertains to make and use the same.

My invention relates to an improvement in fenders for cars, the object of the invention being to produce a fender which will operate effectually to prevent injury to persons with whom it may come into contact.

A further object is to so construct a car-fender that it will readily accommodate itself to vibrations of the car and curves in the track.

A further object is to so construct a car-fender that the impact resulting from the engagement with the fender of a person will be materially reduced.

A further object is to produce a car-fender which shall be simple in construction and effectual in all respects in the performance of its functions.

With these objects in view the invention consists in certain novel features of construction and combinations and arrangements of parts, as hereinafter set forth, and pointed out in the claims.

In the accompanying drawings, Figure 1 is a view showing the application of my improvements. Fig. 2 is a plan view. Figs. 3, 4, 5, 6, and 7 are detail views.

A represents a portion of a car-truck, and B my improved fender connected therewith. The fender *per se* comprises a frame or foundation plate having dished sides 1 1 and a front dished or trough-shaped bar 2, made in a single piece with the sides 1 1. Side bars *a* are secured in the dished sides 1 and hinged to a transverse bar 3. The fender also has an upwardly and rearwardly projecting portion 4, the ends of the frame 5 of which are made with tongues or projections 6, which are pivotally connected with the side bars of the main frame, the portion of the frame 5 in rear of said tongues or projections forming shoulders 7, which normally rest on the side bars *a* of the main frame and maintain the hinged portion 4 of the fender in its operative position. The portion 4 of the fender is further provided with an inwardly-projecting perforated flange 8, and the main frame is also provided with perforated flanges 9 10, which project inwardly from the sides 1 and the front bar 2 of said main frame. To the several perforated flanges above mentioned a suitable netting is attached. The flange 10 of the front bar 2 is provided with bearings for a transverse shaft 11, to the ends of which curved arms 12 are secured, said arms extending upwardly and forwardly through recesses formed between the ends of the flanges 9 10. In the free ends of the arms 12 the ends of a roller 13 are mounted, and this roller is normally disposed in the trough-shaped front bar 2 of the fender-frame. Thus it will be seen that when the fender strikes a person or other object the roller 13 will be raised bodily, carrying the object with it, and the said object will also be permitted to move freely onto the netting of the fender without being subjected to the injurious effects which would be produced were the part of the fender-frame with which it first comes into contact perfectly rigid and unyielding. By means of the yielding roller 13 the impact resulting from the engagement with a person or object by the fender will be reduced to a minimum, and much discomfiture, which might otherwise result to the victim, will be obviated. The upward or rearward movement of the roller will be limited by means of stops 14, so that the roller can drop into its normal position in the trough-shaped front bar 2 by its own gravity.

Brackets 15 are secured to the transverse bar 3, and projecting forwardly therefrom are provided at their free ends with diagonally-disposed sockets 16 for the reception of journals of similarly-disposed wheels 17, which latter are adapted to run on the track-rails, said wheels being almost entirely under the side bars 1 and the flanges projecting therefrom, so that they will not be liable to be struck by an object falling onto the fender.

By disposing the wheels diagonally I am enabled to use wheels of considerable size and weight, which will readily keep to the tracks and hold the fender in proper relation thereto. The fender will be maintained very slightly above the track-rails by means of springs 18, secured at one end to the transverse bar 3 and bearing at their other ends against the under faces of the arms or bars 1 1 of the fender-frame. From this construction it will be seen that when the fender engages an object on the track said fender will be permitted by the springs 18 to descend onto the track-rails and absolutely prevent the object or any part thereof from passing under the fender.

The coupling-head 19 on the car has a hinged connection 20 with the draw-bar 21, and to the transverse bar 3 a perforated arm 22 is hinged, said perforated arm being adapted to enter the coupling-head, so that the hole in said arm will aline with the holes in the coupling-head for the reception of the ordinary coupling-pin 23, and thus the fender is attached to the coupling-head and the fender will be permitted to have sufficient vertical motion to accommodate itself to unevenness in the track and not be affected by the vibrations of the car.

A bar 24 is connected with the front end of the car-truck, preferably under the draw-bar, by means of a frame 40, and provided centrally with a forwardly-projecting lug or arm 25, from which a pin 26 projects upwardly. This pin enters a socket 27 in the center of a transverse bar 28, the socket being of such size relatively to the diameter of the pin that the latter can have a free play therein and permit the bar 28 to have a slight pivotal movement. The ends of the bar 28 are provided with socket-pieces 29 for the reception of pins 30, and each pin is made with a bifurcated head 31, which is pivotally connected to a lug on a socket-piece 32. Through each socket-piece 32 a pin 33 on one end of an arm 34 passes loosely. Similar arms 35 are pivotally connected to the transverse bar 3, and the respective arms 34 35 are pivotally connected together by means of pins 36. The two pins 36 are connected together by means of a spring 37.

From this construction and arrangement of parts the vertical movements of the fender, above alluded to, will be permitted. The fender will also be permitted to have the necessary lateral or pivotal movements to allow it to readily run on curves, and the spring 37 will serve to right itself when a straight track is reached and to maintain the fender normally in line with the track.

My improvements are simple in construction and effectual in the performance of their functions.

The fender can be removed by withdrawing the coupling-pin 23 and lifting the bar 28 from the pin 26. The bar 24 will preferably be provided with curved arms 38, which embrace the bar 28 and limit its pivotal movement.

All connections between the fender and the car are made, as far as possible, with the truck and not with the car itself.

Having fully described my invention, what I claim as new, and desire to secure by Letters Patent, is—

1. The combination with a fender-frame having a recessed or trough-shaped front bar, of a roller normally disposed in said recess or trough, said roller having a pivotal connection inwardly removed from said recess or trough, substantially as set forth.

2. The combination with a fender having a recessed or trough-shaped front bar, of a roller normally disposed in said recess or trough and having a pivotal connection with the fender-frame inwardly removed from said recess or trough whereby the roller can be swung rearwardly out of said recess or trough, and stops to limit the rearward movement of the roller, whereby the roller will be permitted to fall by its own gravity into said recess or trough, substantially as set forth.

3. The combination with a fender having a recessed or trough-shaped front bar and a flange projecting inwardly therefrom, of a shaft mounted under said flange, arms secured to the ends of said shaft and adapted to project over said recessed bar, and a roller mounted in the free ends of said arms, substantially as set forth.

4. The combination with a bar adapted to be attached to a car, and a fender, of toggle-levers connecting said bar and fender, and a spring extending from one toggle-lever to the other, substantially as set forth.

5. The combination with a bar adapted to be attached to a car, and a fender, of socket-pieces at the ends of said bar, pins in said socket-pieces, socket-pieces having hinged connections with said pins and toggle-levers between said last-mentioned socket-pieces and the fender, substantially as set forth.

6. The combination with a bar adapted to be secured to a car and a coupling-head adapted to have a vertical movement, of a bar loosely connected with said first-mentioned bar, a fender connected with said loosely-mounted bar, and an arm hinged to the fender and connected with said coupling-head, substantially as set forth.

7. In a car-fender, the combination with a frame or foundation plate made in a single piece and having dished sides and front, of side bars secured in said dished sides, a rearwardly-movable roller normally resting in said dished front, flanges projecting from said dished sides and front, and netting secured to said flanges, substantially as set forth.

In testimony whereof I have signed this specification in the presence of two subscribing witnesses.

WILLIAM EVERDELL.

Witnesses:
HENRY C. EVERDELL,
C. A. EVERDELL.